Jan. 28, 1958 R. J. GAUBERT 2,821,576

MAGNETIC TAPE APPARATUS

Filed Oct. 22, 1954 11 Sheets-Sheet 1

INVENTOR.
Rene J. Gaubert

BY

Fleher and Swain

ATTORNEYS

INVENTOR.
Rene J. Gaubert
BY
Flehr and Swain
ATTORNEYS

INVENTOR.
Rene J. Gaubert
BY
Flehr and Swain
ATTORNEYS

MAGNETIC TAPE APPARATUS

Filed Oct. 22, 1954

INVENTOR.
Rene J. Gaubert
BY
Flehr & Swain
ATTORNEYS

INVENTOR.
Rene J. Gaubert
BY Fleher & Swain
ATTORNEYS

INVENTOR.
Rene J. Gaubert
BY
Fisher and Swain
ATTORNEYS

INVENTOR.
Rene J. Gaubert
BY Flehr and Swain
ATTORNEYS

INVENTOR.
Rene J. Gaubert
Fisher and Swain
ATTORNEYS

INVENTOR.
Rene J. Gaubert
BY Flehr & Swain
ATTORNEYS

INVENTOR.
Rene J. Gaubert
BY
Flehr & Swain
ATTORNEYS

Jan. 28, 1958 R. J. GAUBERT 2,821,576

MAGNETIC TAPE APPARATUS

Filed Oct. 22, 1954 11 Sheets-Sheet 11

INVENTOR.
Rene J. Gaubert

BY

[signature]

ATTORNEYS

United States Patent Office 2,821,576

Patented Jan. 28, 1958

2,821,576

MAGNETIC TAPE APPARATUS

Rene J. Gaubert, Oakland, Calif.

Application October 22, 1954, Serial No. 463,889

31 Claims. (Cl. 179—100.2)

This invention relates generally to magnetic tape apparatus and more particularly to apparatus of this type in which several records can be reproduced in a pre-selected manner.

In the past various machines have been developed which can be loaded with records of the disk type, and which will play the records in a pre-selected manner. There are several objections to such machines. The records are subject to wear with resulting deterioration in quality of reproduction. The disk records are not well adapted to the more recently developed recording techniques for high fidelity and stereophonic music. In addition, the records are made to standard side, thus placing a limitation upon the length of each recording.

In accordance with the present invention I provide a machine which overcomes the disadvantages of machines of the disk type, and which makes use of recordings on magnetic tape. Accordingly, it is an object of the invention to provide a machine utilizing records of the magnetic tape type, and which is capable of a pre-selection to permit the recordings to be played in a predetermined order.

Another object of the invention is to provide a machine of the above character which will facilitate introduction and removal of tape recordings.

Another object of the invention is to provide a machine of the above character in which the several tapes are carried by magazines, thereby facilitating application and removal of individual tapes, and simplifying operation of the machine with respect to tape threading and reeling operations.

Another object of the invention is to provide a machine of the above character which makes possible the reproduction of stereophonic or binaural sound records.

Another object of the invention is to provide a machine of the above character having novel means for retaining several tape magazines, for establishing operative engagement to move the tape past magnetic reproducing heads, and for rewinding the tape when playing of a selection has been completed.

Another object of the invention is to provide a magnetic tape machine of the above character having novel means for carrying out a selecting operation in accordance with a desired program, and automatically repeating the program.

Additional objects and features of the invention will appear from the following description in which the preferred embodiments of the invention have been shown in detail in conjunction with the accompanying drawings.

Referring to the drawings:

Figure 19 is a cross sectional view taken along the line 19—19 of Figure 5.

Figure 20 is a plan view of a portion of the selector panel, with the panel broken away to expose certain of the selecting switches.

Figure 21 is an enlarged view showing a portion of Figure 5, and showing the switches and selector rings.

Figures 22, 22A, 22B and 22C are plans, side elevational in section, and a bottom plan view respectively of one of the selector knobs.

Figure 1:
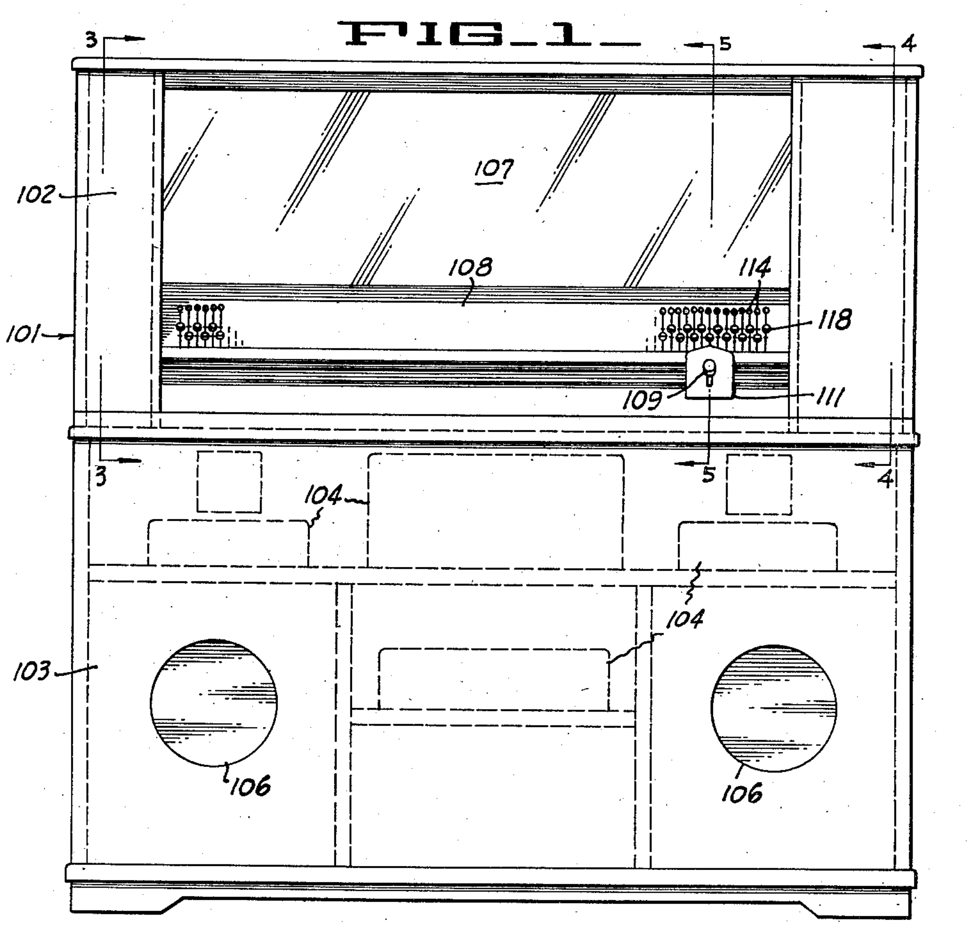
Figure 1 is a front elevational view illustrating apparatus incorporating the invention.

In general, the apparatus as shown in Figure 1 comprises a cabinet 101 having an upper portion 102 which houses the tape recordings together with the playing head and the selecting mechanisms, and a lower portion 103 which may house the electronic components 104 such as the sound amplifiers and their power supplies. Also the lower part of the cabinet may mount the speakers 106. The front of the upper portion 102 includes the selection panel 108 and sliding glass windows 107. The selector handle 109, which is adapted to be moved to various positions, and select indicator 111, are also shown as they appear from the front of the machine.

A plurality of tape magazines 112 each having tape with recordings thereon (Figures 5, 7, 9 and 18) are mounted in the upper portion of the cabinet in a manner to be presently described. Player head assembly 113 (Figures 5 and 7) serves to pickup the recordings which are then amplified and played through the speakers 106.

Means are provided whereby an operator may select a sequence of recordings which will be played consecutively by automatic operation of the apparatus. Briefly, this selection means works in conjunction with the player head which moves traversely across the apparatus to position the head adjacent the desired magazine. The magazine is then shifted to bring the tape recording into contact with the magnetic pickup units of the head. A tape feed drive moves the tape past the head at a constant rate of speed and takeup means serves to wind the tape on a takeup reel. When the reproduction is completed, the magazine is retracted and the tape is rewound on the supply reel. The player head moves to the next selected recording after the magazine is retracted. The rewinding operation continuing as the next reproduction is being played.

The selector panel is shown in Figures 1, 2, 19, 20 and 21, and is provided with a row of number display windows 114. The number of windows corresponds to the number of magazines. The openings 116 provide a recess for the spring loaded button 117 which indicates the number of the selection being played. For example, in Figure 2, the button 117 shows up at selection No. 6. Referring to the openings 114, which displays the magazine number, we see that reel 10 is being played. When the playing of selection 10 is completed, the selecting mechanism will move as will be herein described and the button 117 will appear at the next opening showing selection No. 7, and the corresponding magazine number will be visible at the corresponding window 114.

Figure 2:
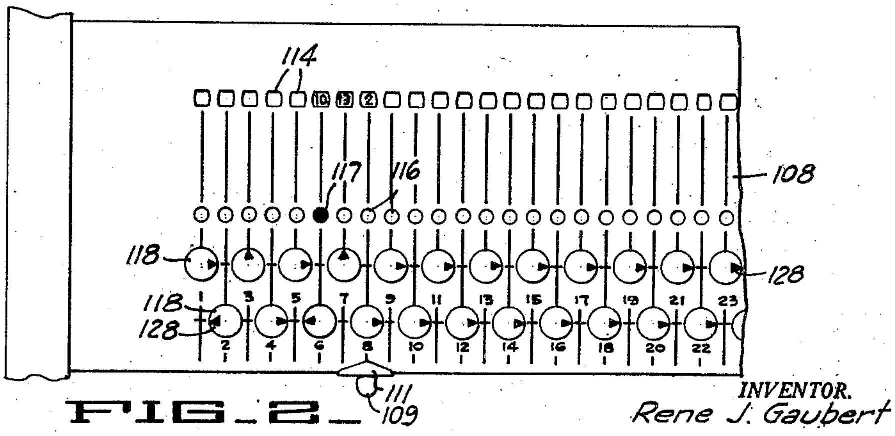
Figure 2 is an enlarged view of a portion of the selection panel.
Figure 3:
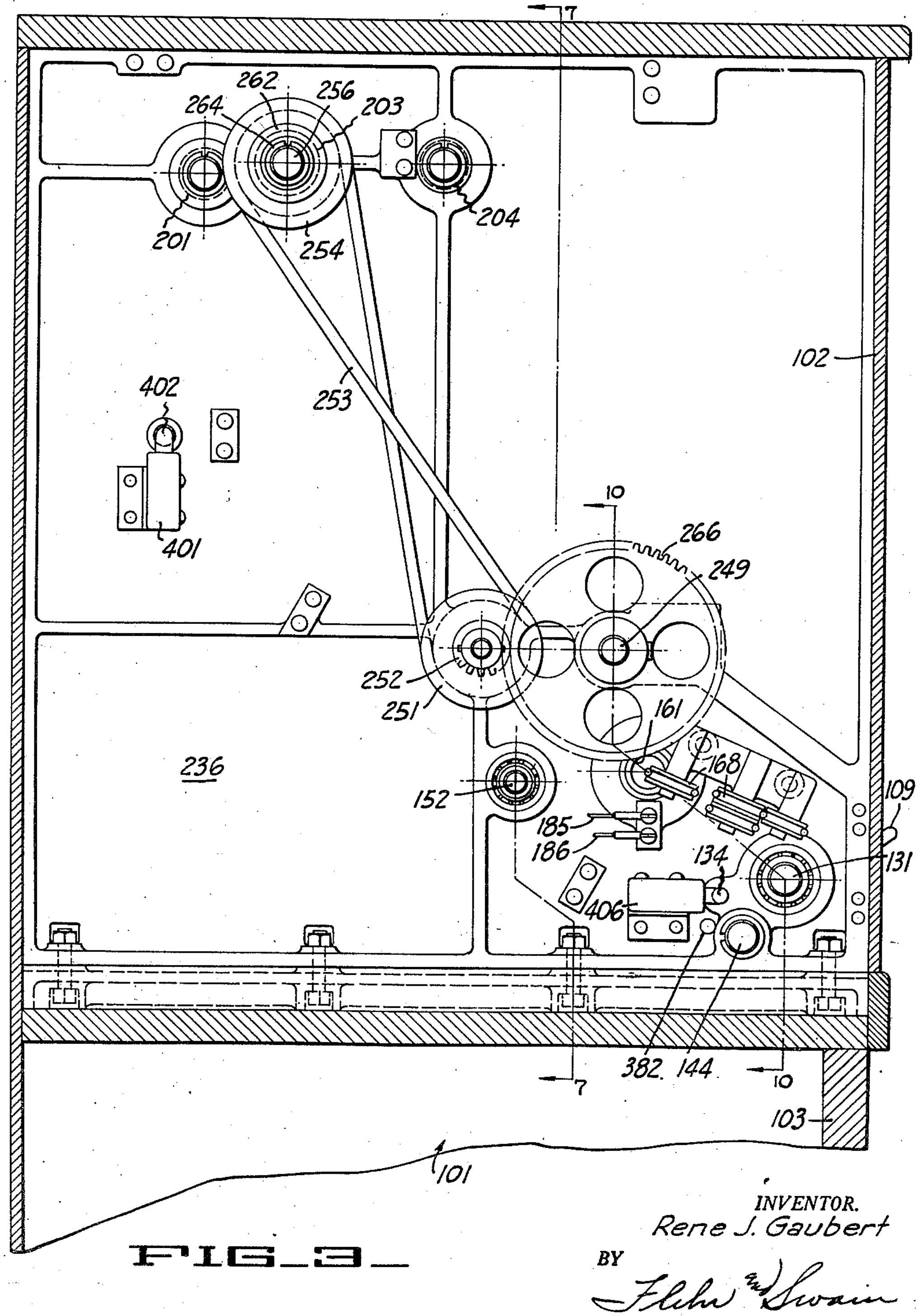
Figure 3 is a cross sectional view taken along the line 3—3 of Figure 1.

For binaural reproduction it is desirable that two recordings be placed on the magnetic tape. It may also be desirable to place different recordings on a single tape. It is necessary to provide means for playing the recordings simultaneously for binaural, or separately if different recordings appear on the tape. The knobs 118, which have three operating positions, are mounted with means making possible such selection. In one position the selection recorded on the right hand side of the tape is played. A second position plays the selection on the left hand side of the tape, and the third position provides binaural reproduction. Referring to Figure 2, by way of example, selection 5 was played on the right hand side of the tape, selection 6 is playing the left hand side of the corresponding tape, and selection 7 will play binaural.

Figures 19, 20, 21, 22:
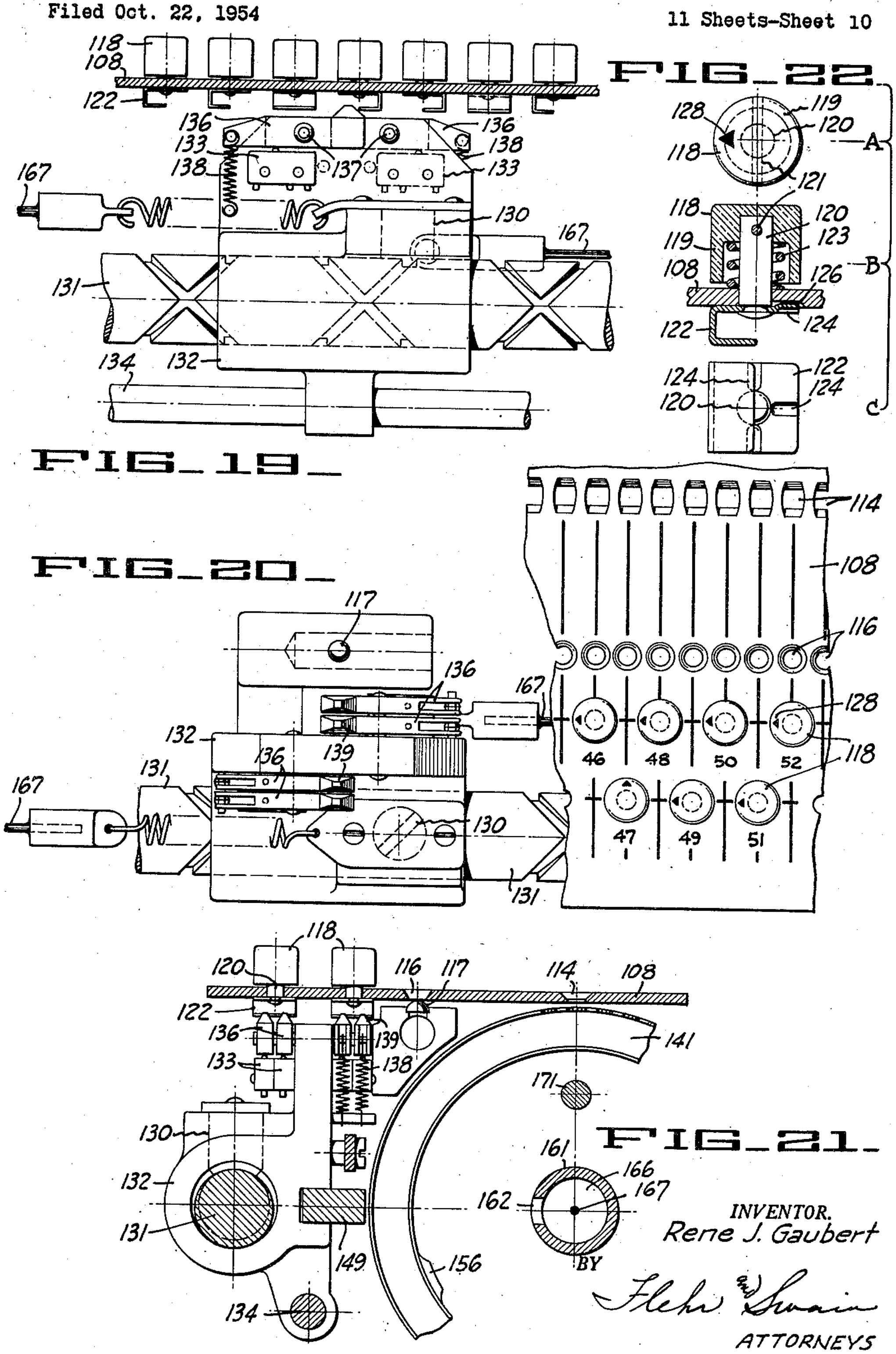

Referring to Figure 22, each knob 118 consists of a cupped-shaped portion 119, fixed to a shaft 120, for example, by means of pin 121. The shaft passes through the panel and is fixed to a U-shaped metallic portion 122. Spring 123 urges the U-shaped portion 122 against the under surface of the panel. The U-shaped portion 122 is provided with a raised portion 124 which engages the detents 126 to positively position the knob. The indicator 128 serves to indicate the position of the knob.

Switching means which work in conjunction with the knobs 118 to select either right, left or binaural reproduction, is shown in detail in Figures 19, 20 and 21. A double threaded select transfer screw 131 extends through the switch mount 132 and is engaged by the driving dog 130. As the screw rotates the mount and switches 133 carried by the same move traversely across the apparatus. The shaft 134 also extends through the mount and serves to prevent its rotation. As will be presently shown, the double threaded traverse screw serves to move the switches 133 from one select knob to the next as each reproduction is completed. The screw is caused to rotate after each recording has been reproduced and then only an amount which will advance the switches to the next selector knob 118. Two pair of switches 133, connect in parallel, are provided, and are depressed by the arms 136, which are pivoted at 137 and held against the switch by spring 138. The arms 136 have projections 139 at their free ends. Referring to Figure 20, I have shown a top view of the arms 136. There are two pairs of such arms corresponding to the two pair of switches which ride past the two rows of knobs 118. The projections 139 are adapted to engage the U-shaped metallic portion 122. The switches 133 are so constructed that when the projection 139 strikes the metallic portion 122, the switches make contact. Therefore as the switches ride past the portion 122, either one or both of the switches may be turned on, depending upon the rotational position of the U-shaped portion 122, which in turn is controlled by knobs 118. The knobs 118 are placed in two rows for the operator to have adequate space to manipulate them. Consequently two pair of switches are provided. However, by making the panel longer, it is possible to place all the knobs 118 in a single row and to eliminate one pair of switches 133. As previously stated, the basic function of switches

133 is that of selecting either the right, the left or binaural playing of the recordings recorded on the tape. This will be explained in detail in connection with the description of the electrical circuit.

Figures 5, 6:
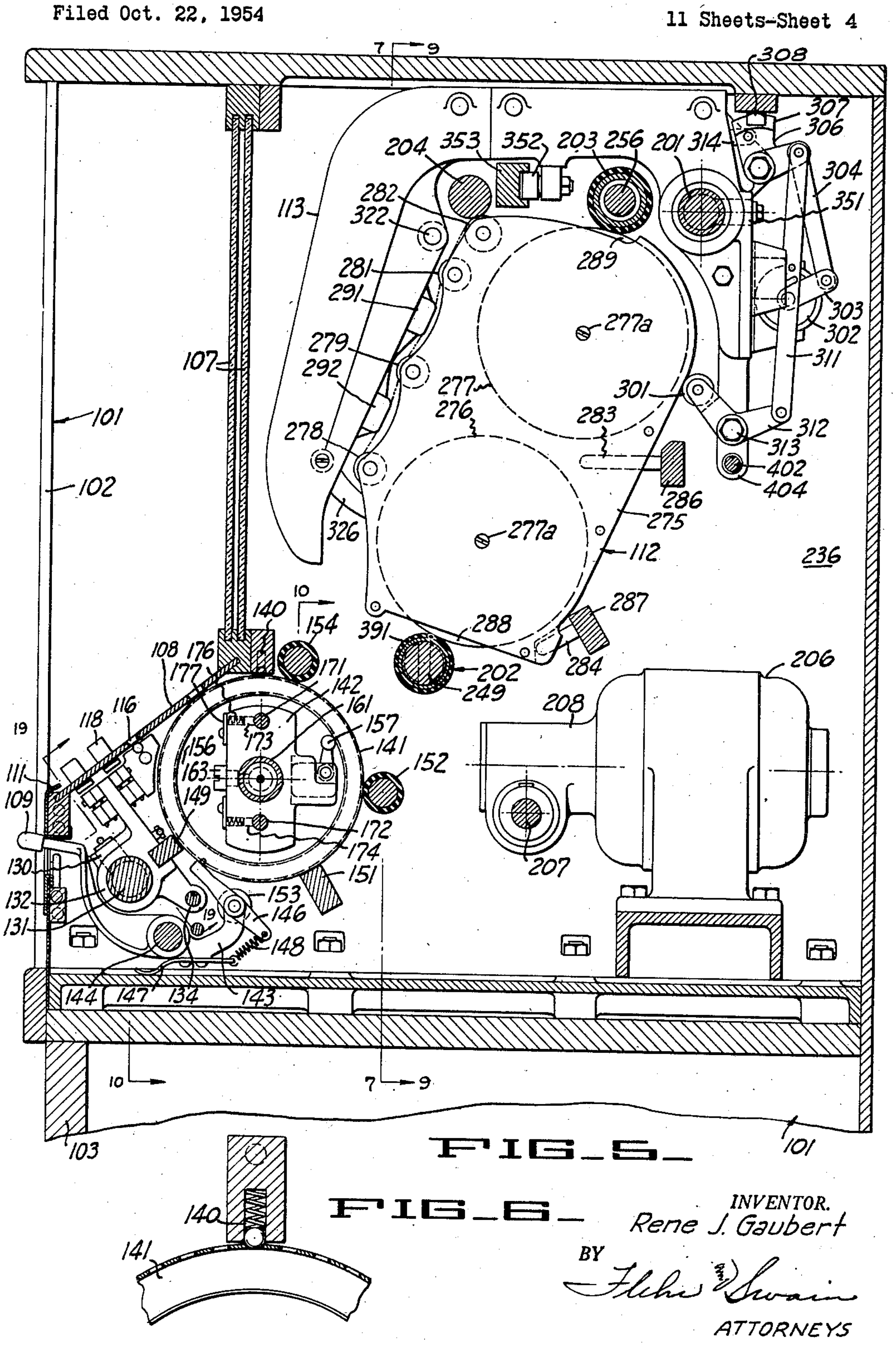
Figure 5 is a cross sectional view taken along the line 5—5 of Figure 1.
Figure 6 is a cross sectional view of a portion of the selector ring employed, and the positioning detent associated with the same.
Figure 10:
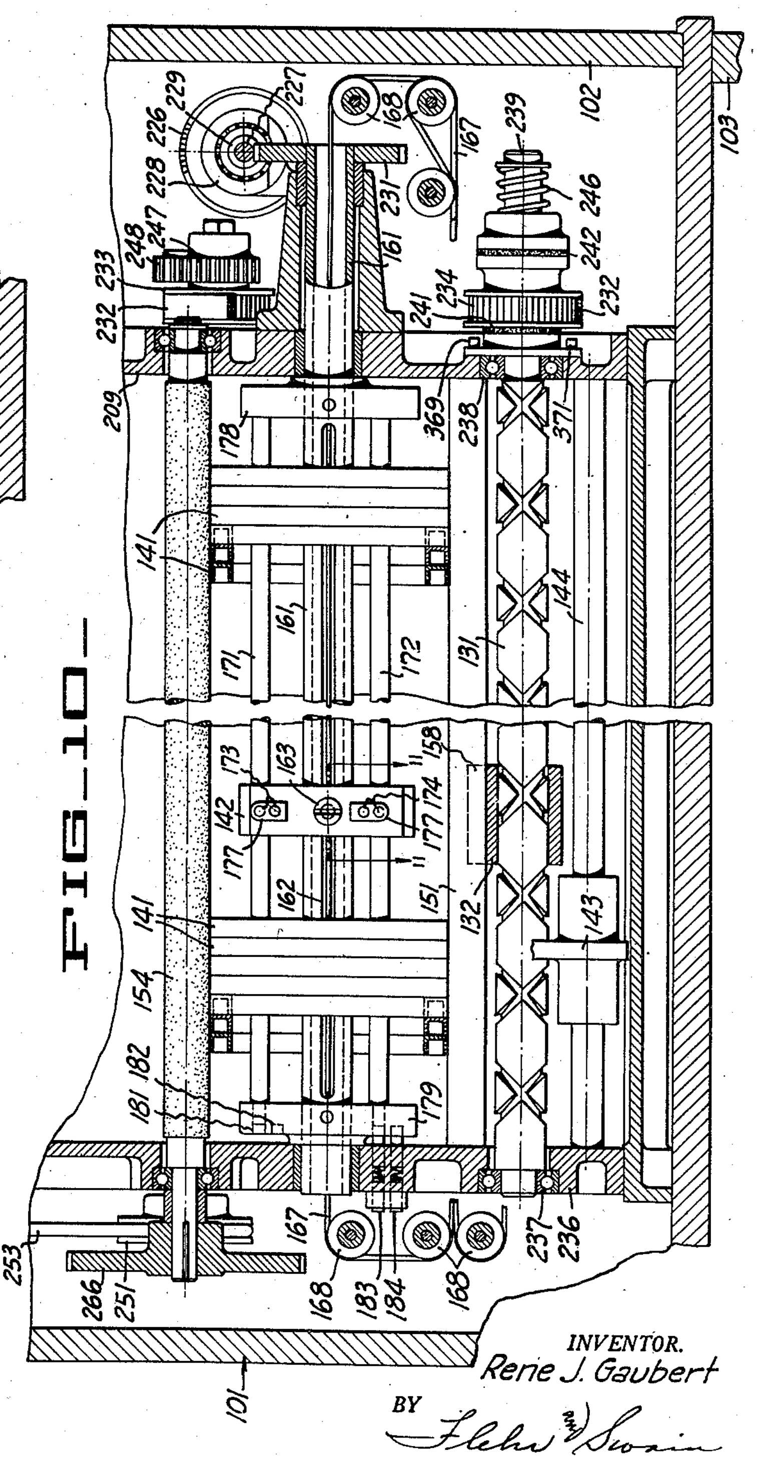
Figure 10 is a partial cross sectional view taken along the line 10—10 of Figures 3, 4 and 5.

Thus far, I have described means for selecting the right, left or binaural recording. I will now describe the mechanism which determines which of the plurality of magazines will be selected by the player head 113. Referring to Figures 5 and 10, a plurality of selector rings 141 are provided to act in conjunction with a hunt head 142. On the periphery of each selector rings 141 there are equally spaced indicating numbers, one for each magazine. The rings 141 are rotated in a manner to be presently described until the number of the desired magazine for that selection appears in the magazine number display window 114 (Figures 2, 20 and 21). The number of select rings 141 will correspond to the number of magazines for which the apparatus is designed. The rings are provided with a plurality of depressions which are engaged by a spring loaded ball to positively locate the rings. This is shown at 140 (Figures 5 and 6).

Referring now to Figure 5, the means by which the selector rings 141 are rotated is shown. The selector handle 109 extends through the front panel of the machine, where it may be grasped by the operator. The handle 109 is secured to the arm 143, which in turn is pivoted to a cross member 144 that extends between side frames 209 and 236. By depressing handle 109 the arm 143 is pivoted about the cross member 144, thereby driving the pawl 146 into engagement with the corresponding select ring 141 to advance it through one number. The spring 146 serves to return the arm 143 to its original position, and the spring 148 serves to hold the pawl in engagement with the ring. As shown, the selector rings are loosely supported by cross members 149, 151 and 152. By depressing the knob 109 completely, the wheel 153 comes into contact with the ring 141. This causes the select rings to come into driving engagement with the rubber covered drive roller 154, which is continuously driven as will be described in conjunction with the motive means. This permits rapid rotation of the select ring to a desired position.

The magazine selector mechanism including handle 109 and arm 143 is adapted to slide along the cross member 144 to thereby selectively engage any one of the plurality of selector rings 141. In this way, it is possible to set as many of the rings as desired to particular magazine selections. As will be presently described, the hunt head will then engage with these rings consecutively to thereby index the player head with the magazines in the order selected.

The inner surface of each select ring 141 is provided with a cam 156. The hunt head 142 houses a switch (not shown) which is actuated by the lever 157. When the lever 157 is contacted by the cam 156, the switch is closed.

Referring now to Figure 10, which shows a sectional view of the selector assembly, there is shown the selector ring drive roller 154, the assembled selector rings 141, the hunt head 142, the selector switch traversing screw 131, a portion of the selector ring rotating means including lever 143, and the guide member 144. The position of the selector switch mount 158 is shown by dotted lines. This corresponds to the position of the hunt head 142, as will be presently shown.

Figure 11:
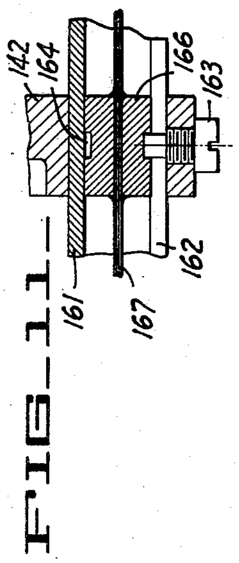
Figure 11 is a cross sectional view taken along the line 11—11 of Figure 10.

A tube 161 passes through the hunt head, and is provided with a slot 162 extending longitudinally a distance slightly more than that occupied by the hunt rings 141. The screw 163, shown more clearly in Figure 11, engages loosely within the slot 162, and engages the peripheral slot 164 formed in the cylindrical plug 164. This permits rotation of the tube 161 and head without rotation of the plug 164. The plug 164 is attached to an endless cable 167. This cable is received over a series of pulleys 168 as diagrammatically shown in Figure 18, and is attached at its ends to the switch mount 132. By the pulley and cable arrangement shown in Figure 18, movement to the right of the switch mount 132 causes an equal movement to the right of the plug 164. Since hunt head 142 is engaged with the plug 164 by means of screw 163, the hunt head moves an equal distance.

A switch (not shown), is activated by the lever 157 and its terminals have sliding contact with the current carrying bars 171 and 172 (Figures 5 and 10) by means of brushes 173 and 174. The brushes are held in contact with the bars 171 and 172 by springs 176 and the plugs 177.

The bars 171 and 172 have their ends mounted in members 178 and 179. In member 179 the commutator bars are attached to slip rings (not shown) which form the bottom portions of the grooves 181 and 182. The spring urged brushes 183 and 184 ride in these grooves thereby making continuous connection between each of the bars 171 and 172 and the terminals 183 and 184.

Driving torque to all rotating parts is provided by a motor which is engaged with positive belt driving and gearing means, and associated friction drives, shown in Figures 3, 4, 5, 7, 9 and 10. Specifically, torque is supplied for the select switch driving screw 131, player head traverse screw 201, rewinding rollers 202, takeup rollers 203, tape feed roller 204 and the select ring roller 154.

Figure 9:
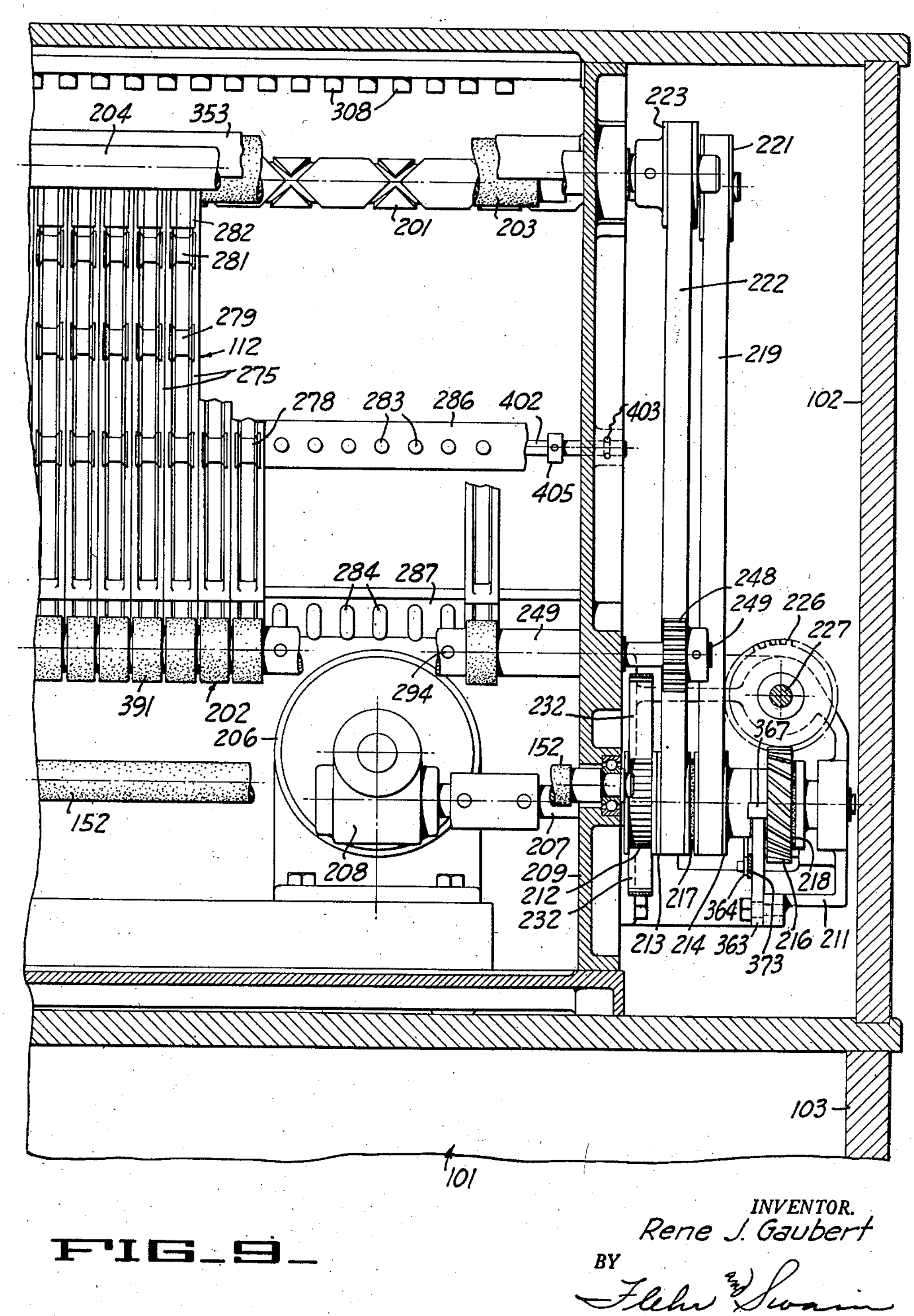
Figure 9 is a partial cross sectional view taken along the line 9—9 of Figure 5.

In the embodiment shown, a single synchronous motor 206 is employed to power the apparatus. It may be desirable in certain applications to employ two motors to power the apparatus, a synchronous motor to power the capstan drive and a second motor, which could be an induction motor, to power the remainder of the apparatus. Referring to Figure 9, the motor 206 is geared to the shaft 207 through a speed reduction gearing 208. This shaft 207 extends through and is journaled in the side plate 209. A supporting bracket 211 with bearings forms a rigid support for the shaft at its outer end. Toothed pulleys 212 and 213 are keyed to the shaft 207. Toothed pulley 214 and gear 215, which are attached together, are mounted loosely on the shaft. Friction disks 217 and 218 transmit torque to the pulley 214 and gear 216 and provide for slippage under certain operating conditions. The belt 219, which has mating teeth on its inside surface, engages pulley 214 and the toothed pulleys 221, which is keyed to the pickup head traverse screw 201. The toothed belt 222 engages pulley 213 and a pulley 223 that is secured to the tape feed roller 204.

Figure 4:
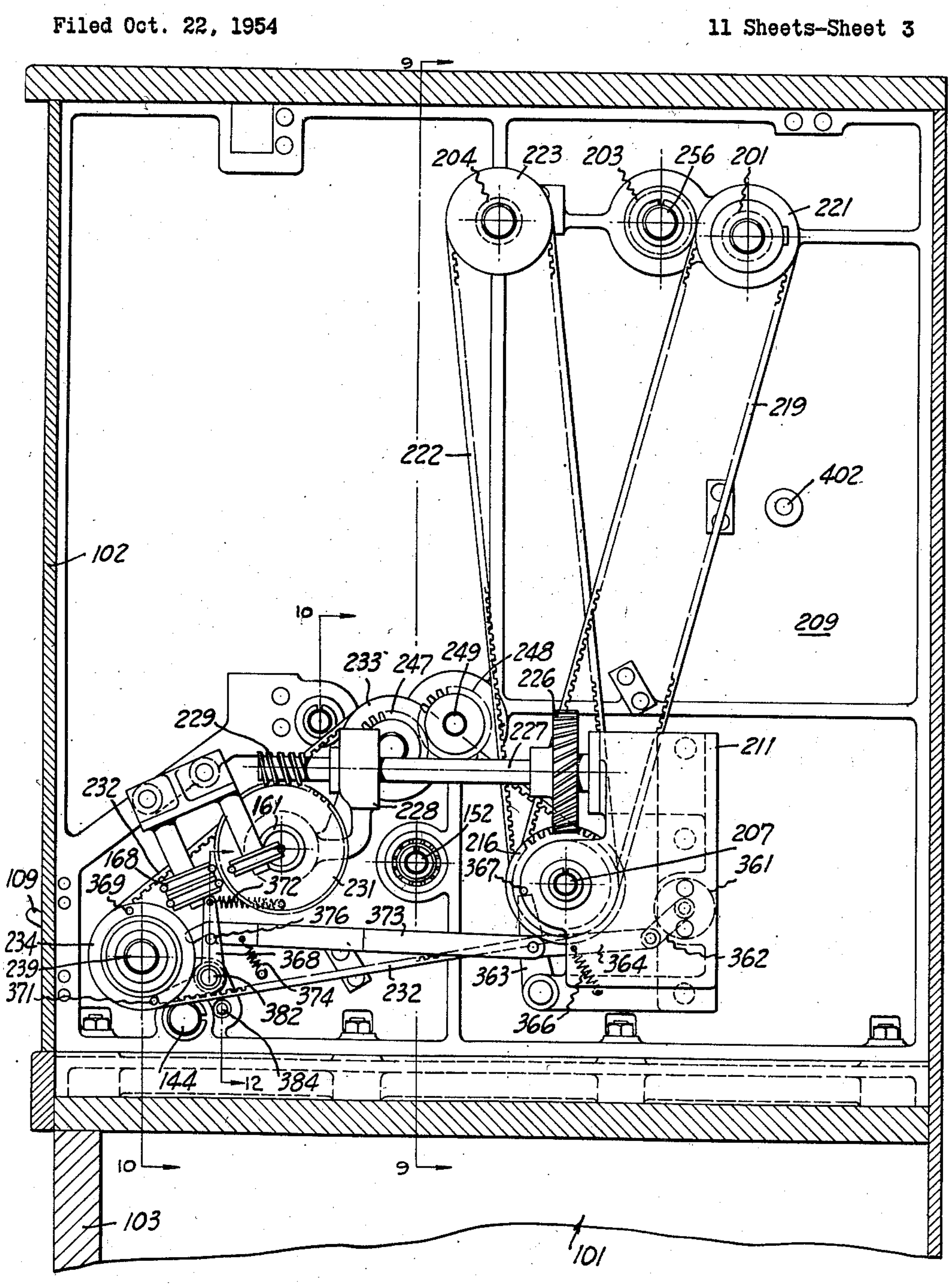
Figure 4 is a cross sectional view taken along the line 4—4 of Figure 1.

The gear 216 which rotates in conjunction with pulley 214, meshes with and drives the gear 226. Referring to Figure 4, the gear 226 is keyed to a shaft 227 which is journaled at 228, and terminates in a worm gear 229. The gear 229 engages the mating gear 231 which is keyed to the tube 161. In this manner, as the player head traversing screw is rotated, the tube 161 is rotated therewith. The gearing is such that a complete traverse of the player head across the head traversing screw equals one complete revolution of the tube 161.

The belt 232 engages the pulley 212, the idler pulley 233, and the pulley 234 (Figure 10). In Figure 10, the select or traversing screw 131 is shown carried by the sideplates 209 and 236, with appropriate bearings 237 and 238. The pulley 234 is rotatably carried on the shaft exterior 239 of screw 231. Disk friction members 241 and 242 are squeezed by the spring 246 and serve to transmit normal operating torque.

Figures 7, 8:
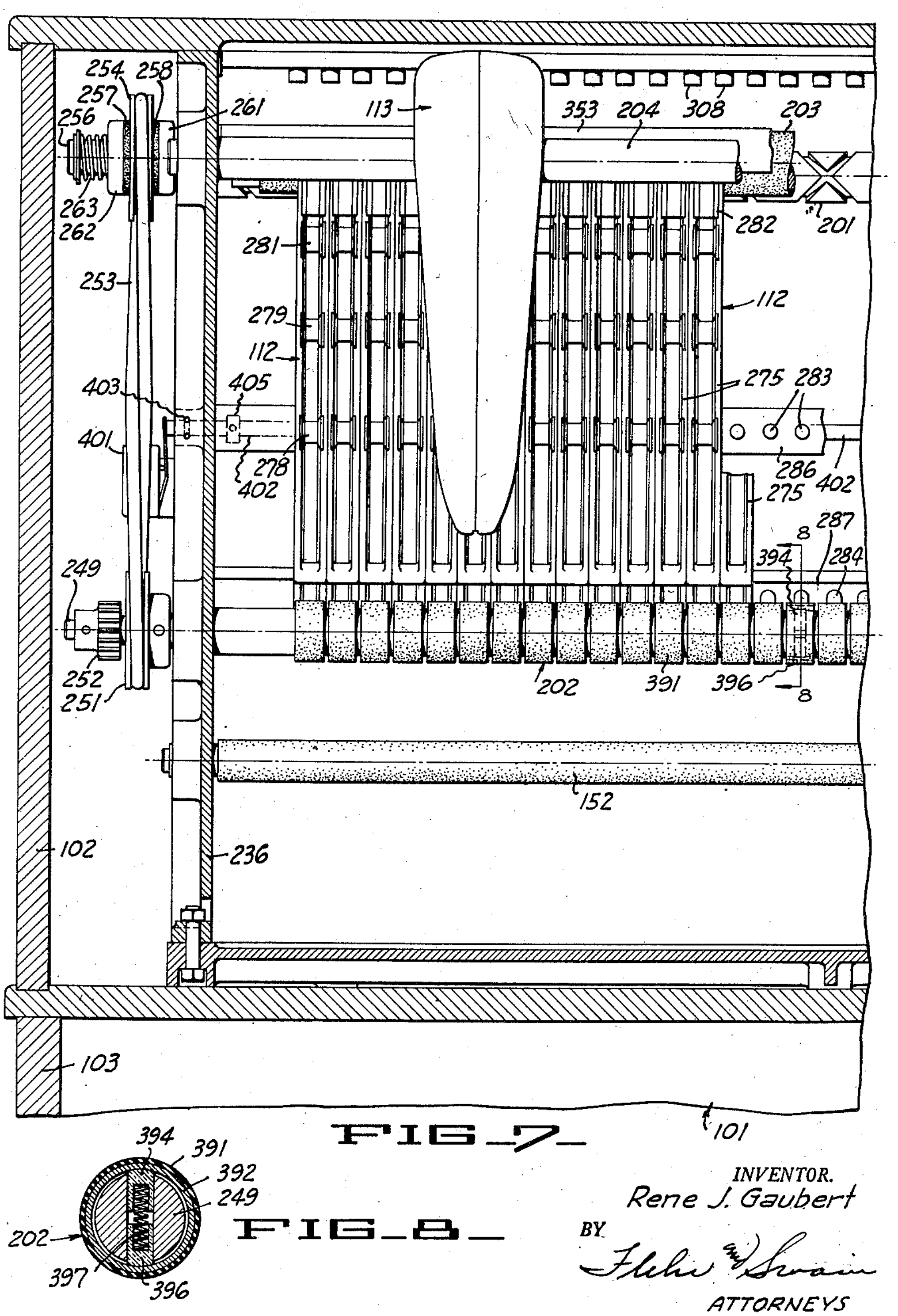
Figure 7 is a cross sectional view taken along the line 7—7 of Figure 3.
Figure 8 is a cross sectional view taken along the line 8—8 of Figure 7.

The idler pulley 233 has a toothed portion engaged with gear 248 which is keyed to the rewind roller shaft 249. Also this shaft 249 serves to provide driving torque for the rollers 202. At its opposite end it extends through and is journaled in the side plate 236, and has a toothed pulley 251 and gear 252 keyed thereon (Figure 7). The belt 253 engages pulley 251 and the pulley 254. The pulley 254 is adapted to rotate freely on the takeup shaft 256, which rotates the takeup roller 203. Friction disks 257 and 258 acting in conjunction with disks 261 and 262 that are keyed to the shaft 256, are squeezed by spring 263 between driving surfaces to transmit torque between the pulley 254 and the shaft 256.

The gear 252 engages a gear 266 that is keyed to the selector ring drive roller 154, as shown in Figure 10. This roller likewise extends between and is journaled in the sideplates 209 and 236.

Figures 17, 18:
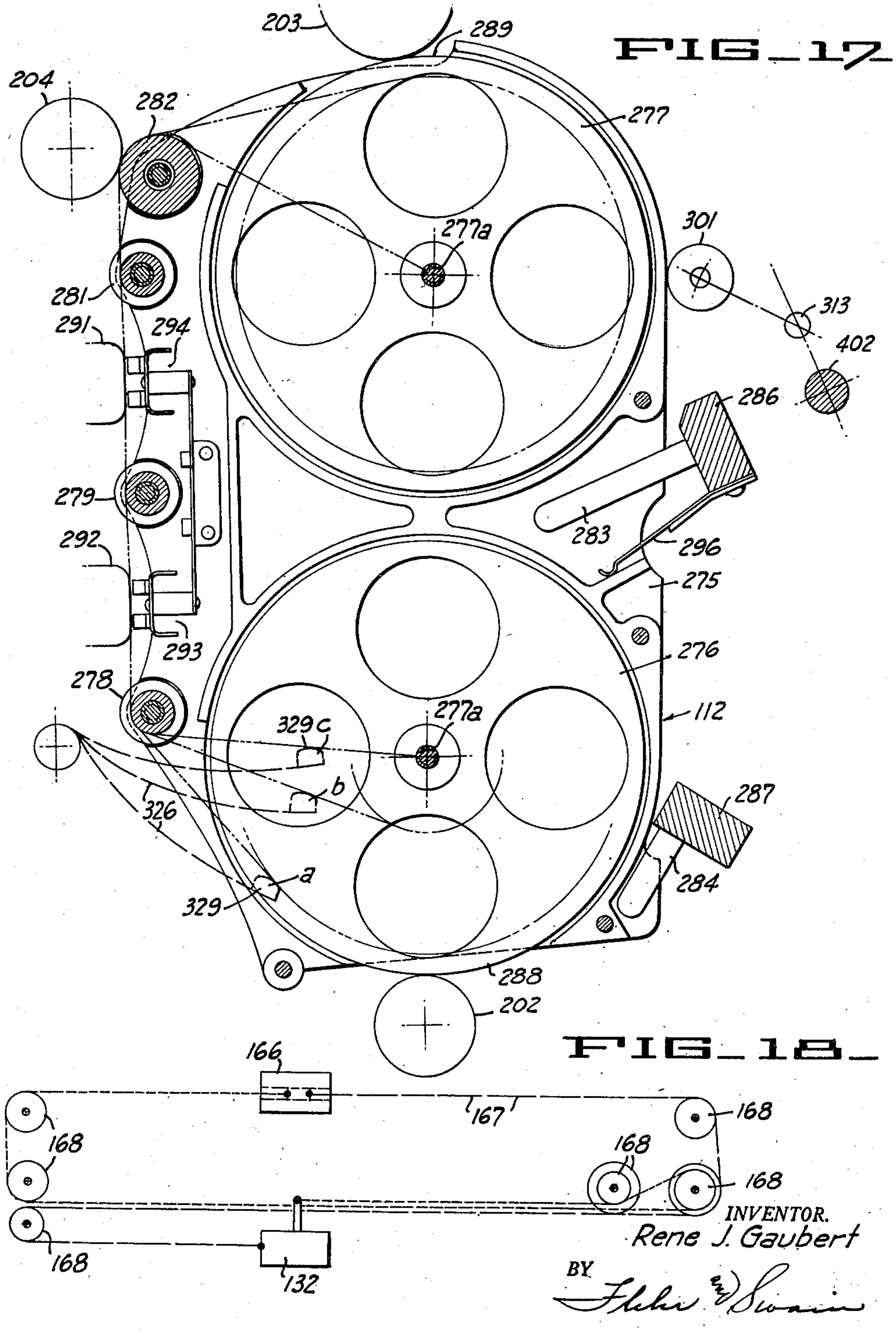
Figure 17 is a side elevational view in section, showing one of the tape magazines, with its associated operating parts.
Figure 18 is a schematic diagram of the hunt head advance cable and associated pulleys.

A novel magnetic tape magazine 112 is shown in Figure 17, and has one cover removed to expose the supply reel 276 and takeup reel 277. Both reels are rotatably carried by stud shafts 277a that are mounted on the frame or body 275 of the magazine. The tape is threaded from the supply reel over the flanged guide rollers 278, 279 and 281, and over the tape feed roller 282, and is wound upon the takeup reel 277. Fingers or pins 283 and 284 are carried by the fixed traverse members 286 and 287. They extend into spaces between wall portions of the body to thereby locate the magazines. The lower portion of the magazine is open to expose a portion of the supply reel 288 for continuous frictional contact with the rewind roller 202. The upper portion of the magazine is open to expose a portion of the takeup reel 289. During the playing cycle, this portion of the reel is frictionally engaged with the takeup roller 203. This serves to wind the tape on the takeup reel while the record is being played. While the tape is playing the magazine is positioned whereby the roller 282 forces the tape against the tape feed drive 204, thereby causing the tape to move past the player head, and pickup heads 291 and 292 at a constant rate of speed. The members 293 and 294 serve to provide a smooth backing surface over which the tape may pass when in contact with the pickup head. The spring 296 urges the magazine in a direction away from the player head and to a retracted position in which rollers 204 and 282 are disengaged. In this connection the rewind roller 202 acts as a fulcrum about which the magazine pivots away from the player head. During the playing of a recording, the roller 301 which is attached to an arm urges the magazine into contact with the takeup roller 203 and the tape feed roller 204. The position of the magnetic tape magazine with respect to the player head 113 during a playing operation, is shown in Figure 5.

Figures 13, 14, 15, 16:
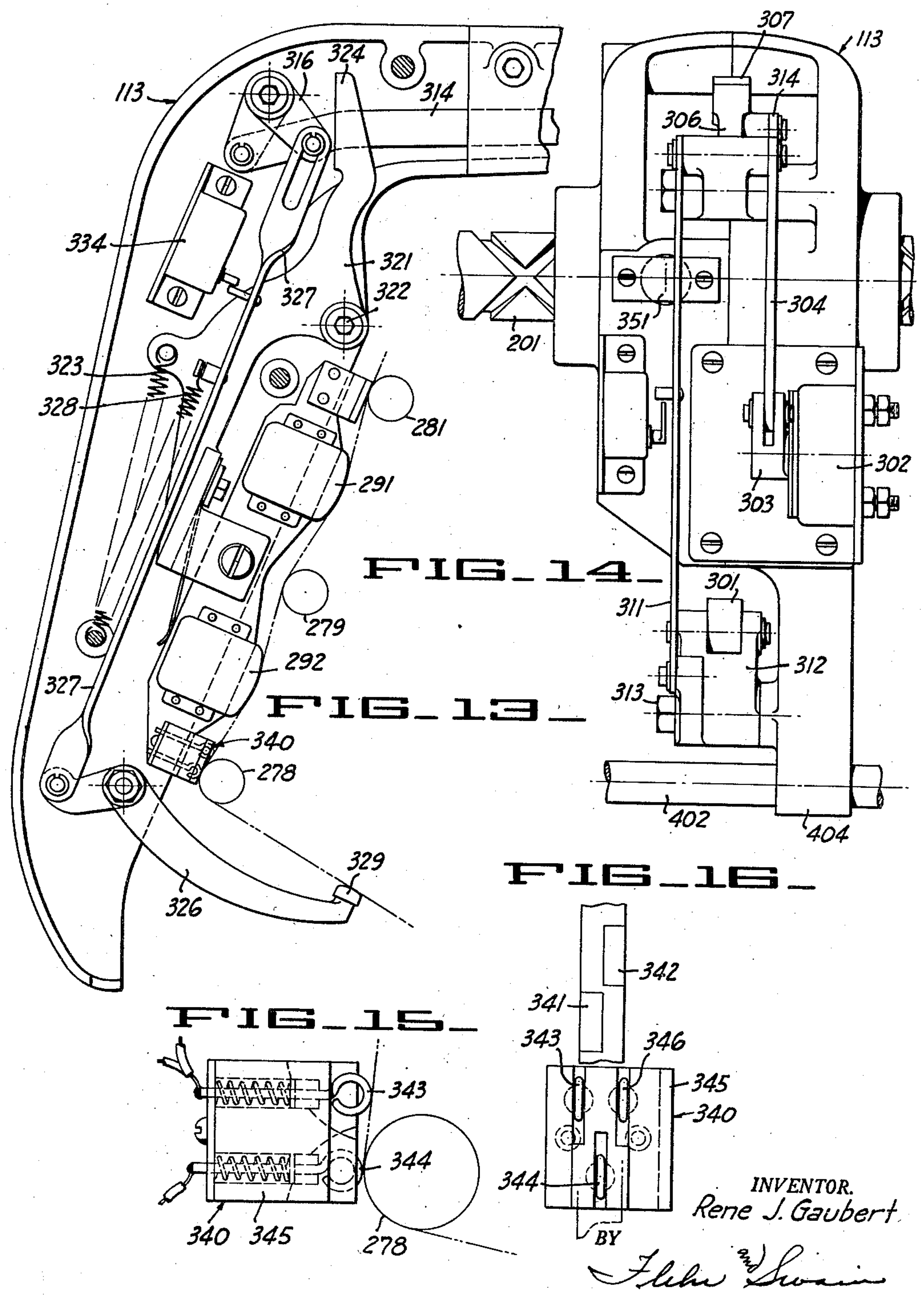
Figure 13 is a side view of the player head assembly.
Figure 14 is a back view of the player head assembly.
Figure 15 is a detail showing means engaging the tape for detecting the end of a recording.
Figure 16 is an end view of the detecting means shown in Figure 15.

The player head is shown in Figures 5, 13 and 14. By means of the hunt head switch, a solenoid 302 carried by the frame of the head, is deenergized when the head is opposite the selected magazine. When deenergized, its operating arm 303 revolves in a counterclockwise direction (Figure 5). The arm 306, likewise carried by the head, is rotated in a counterclockwise direction by link 304. This arm has a portion 307 that is wedge shaped and adapted to engage between the fixed rollers 308. In this manner the head is accurately positioned in the traverse direction. Simultaneously, the solenoid 302 urges the roller 301 against the magazine 112. This is accomplished through link 311 and arm 312, which pivotes about the point 313 in a counterclockwise direction.

The solenoid 302 also drives the link 314 (Figure 13) forward. This swings the connected arm 316 in a clockwise direction. The pickup heads are mounted on the arm 321, which is allowed to pivot in a counterclockwise about the point 322 under the tension of spring 323.

When the solenoid 302 is energized, the wedge 307 is retracted. The link 314 is also retracted whereby arm 316 cams against the surface 324 on an upper extension of the arm 321, thus causing the pickup heads to be shifted away from the tape. The arm 312 also is rotated permitting the spring 296 to rotate the magazine 112 away from the tape feed roller 204, the takeup roller 203 and the player head 113.

The solenoid 302 is energized when the reproduction of the recording has been completed. I have provided two means for energizing the solenoid. In one means, the end of the tape is detected mechanically by means of the level 326, which is adapted to ride on the surface of the tape as is shown in Figure 13. The lever 326 is connected through the link 327, which is urged in one direction by spring 328 whereby the end 329 of the lever is urged against the length of tape extending from the reel. Referring to Figure 17, the lever end 329 is shown in three positions, *a*, *b*, and *c*. In position *a*, the supply magazine is full and the lever is in its outermost position. As the magazine is unloaded, the lever attains intermediate positions between *a* and *c*, such as position *b*. When the supply reel is completely unwound, and the reel begins to override, the lever is in its innermost position, indicated by position *c*. When the lever is moved to position *c*, the switch 334 is closed. This causes the solenoid to be energized, the pickup heads to lift, and the magazine to be withdrawn as previously described.

The second means for energizing solenoid 302 permits the magazine to be retracted, the head advanced to the next selection, and the other operations described above with reference to solenoid 302 prior to the complete unwinding of the supply reel, and employs a record detector 340 (Figures 15, 16). Referring to Figure 16, I have shown two conductive strips 341 and 342 placed on the magnetic tape at the end of the recordings. These strips may be adhesive metal tape, or thin deposited metal films. In Figure 15, I have shown spring loaded contactors which are adapted to engage the tape. There are three such contactors 343, 344, and 346 carried by block 345. As seen in Figure 16, contactors 344 and 346 are shorted together when the contactor strip 342 is reached, while on the other hand, contactors 343 and 344 are shorted together when the contactor strip 341 is reached. The location of the record detector 340 on head assembly 113 is shown in Figure 13 and is located adjacent the guide roller 278. By means of switches 133, in a manner to be presently described, I can make selection of either the combination of contactors 343 and 344, or contactors 344 and 346, to sense the end of recordings. This permits using recordings having different lengths.

The traverse movement of the player head is accomplished by means of the double threaded head screw 201. The dog 351 engages the screw as shown in Figures 5 and 14. Rotation of the head is prevented by the roller 352, which rides in the cross channel 353.

The mechanism which acts in conjunction with the friction drives is as follows: A braking solenoid 361 with arm 362 engages the locking arm 363 through the link 364. The spring 366 draws the link and arm toward the solenoid when the solenoid is deenergized. In this position the arm 363 engages the pin 367, thereby stopping rotation of the player head screw and also rotation of the hunt head, which is connected through the gears 226, 229 and 231. The arm 368 is adapted to engage either of the pins 369 or 371 which rotate with the selector screw. The spring 372 urges the arm into a position where it is located opposite either one of the pins thereby stopping rotation of the selector screw. The link 373 which is held by spring 374 engages the pin 376, the latter being fixed to the arm 368. The linkage described urges the arm 368 out of engagement with either of the pins 369 and 371 when the solenoid 361 is activated. The link 373 then rides over the pin, allowing the spring 372 to draw the arm 368 back into a position where it will contact the next pin. In this manner, rotation of the selector screw is 180-degrees each time the solenoid 361 is energized. Arm 363, however, is held out of engagement with the pin 367 until the solenoid 361 is deenergized.

Figure 12:
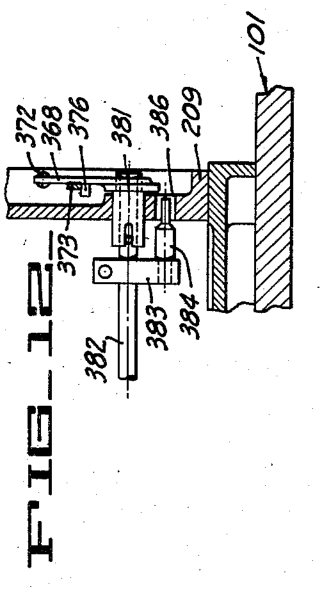
Figure 12 is a sectional view taken along the line 12—12 of Figure 4.

When the switch mount has travelled completely to the right hand side of the selector screw, it engages the arm 368 thereby deactivating the arm until the switch mount has returned to the left hand side of the selector screw. The selector screw is double threaded and rotation in the same direction will drive the switch mount in either direction depending upon which thread the dog engages. When the mount reaches either end the dog automatically engages the other thread. The deactivation is accomplished by means of the arrangement shown in Figure 12. The arm 368 is attached to the bushing 381, which accommodates the shaft 382. The shaft 382 extends across the assembly from the plate 209 to the plate 236, and is adapted to slide in a traverse direction when the select switch mount strikes the abutment 383. This causes the pin 384 to engage in the hole 386, and the arm 368 is thereby held in a position where it will not engage pins 369 or 371. After the selector switch mount has returned to the left hand side, an abutment similar to 383 is struck disengaging the pin 384 from the hole 386 and thereby permitting the arm 368 to again operate, as previously described.

As described in conjunction with the motive means, the tape rewind roller makes positive engagement with the motor driving means and is continuously rotating. Also, the supply reel tape is in constant engagement with the rewind rollers. This could cause difficulty and excessive wear if provision were not made for slippage of the rewind rollers. In Figure 8, I have shown a cross sectional view of one rewind roller. The roller is provided with a series of outer rubber rings or sleeves 391 which form the periphery of the roller and makes frictional engagement with the supply reels. Each ring is mounted on a ring 392 of more rigid material like nylon, and inner ring is grooved as shown in Figure 7. The rewind roller shaft is drilled through the diameter and two plugs 394 and 396 (which may be made of nylon), with the spring 397 between them, are inserted. The torque which tends to rotate the rubber ring 391, is determined by the frictional engagement of the plugs 394 and 396 with the nylon rings 392. In this manner, I provide a substantially constant torque for each of the rings. After the tape has been rewound, slippage occurs between the inner shaft and the particular rubber ring 391 involved. Also during the playing of any record the ring 391 remains engaged with the supply reel, thereby providing a constant tension against which the tape feed roll operates. Consequently the tape passes the pickup heads with uniform tension as is necessary to prevent flutter effects.

Switching means must be provided to permit the player head to go from the extreme right to the left of the head screw without engaging any magazine. It is also necessary to deactivate the player head when the selector switches return from the extreme right to position number 1. In Figure 7, switch 401, which acts in conjunction with the player head, is engaged by the shaft 402. The shaft passes through the side frame 236 and suitable means such as the O-ring 403 serves to provide a small amount of friction against longitudinal movement. When the head has travelled completely to the right, the member 404, Figure 5, which rides along the shaft 402, strikes an abutment on the shaft which causes the shaft to be displaced to the right, thereby releasing the spring arm. Similarly, the switch mount 132, which rides on the selector switch screw and is guided by the guide rod 134, strikes the arm of a switch 406, shown in Figure 3, when it reaches the right hand side. As the switch mount 132 and the member 404 move to the extreme left position, they strike a second shaft abutment which actuates switches to return them to the original open position.

Figure 23:
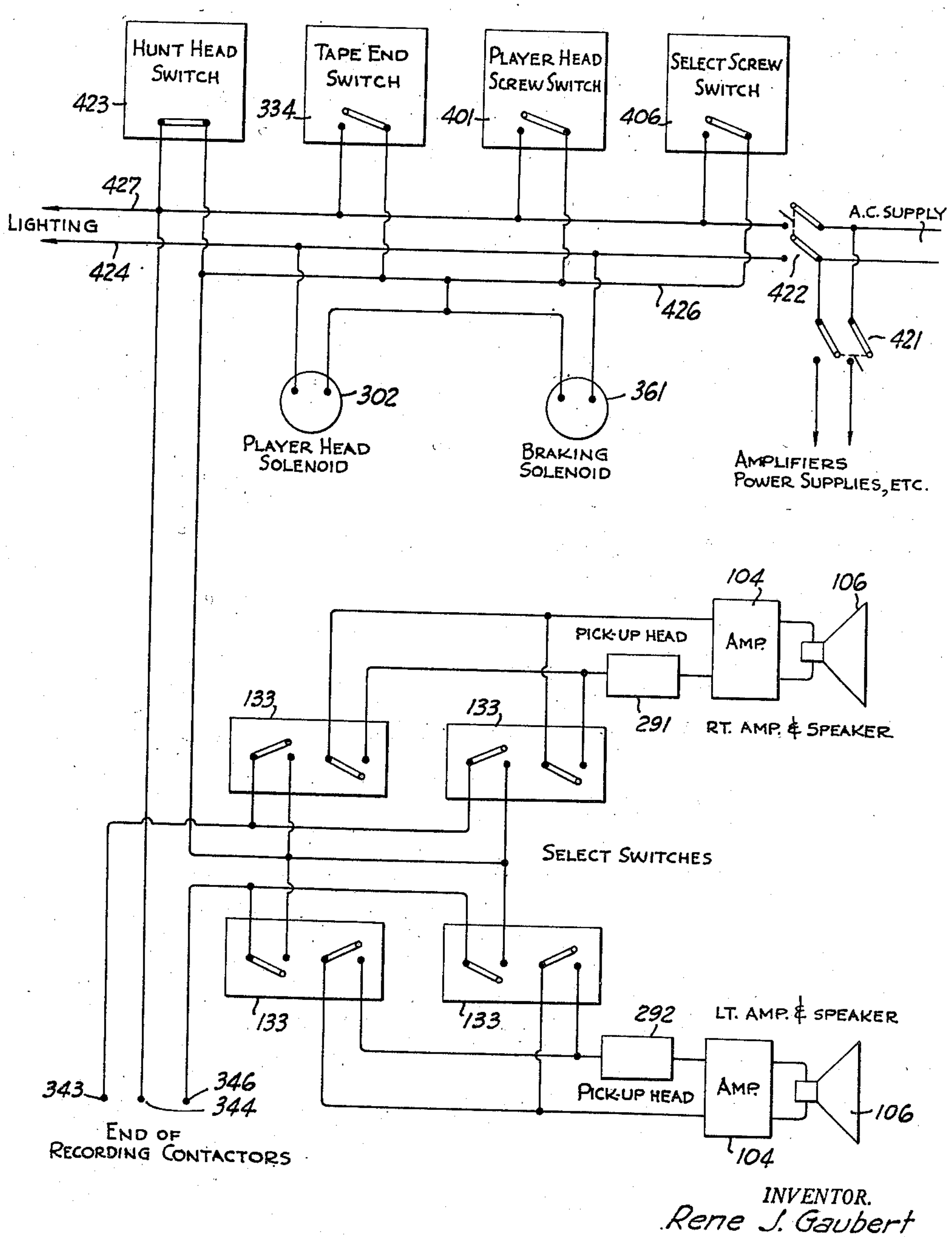
Figure 23 is a schematic circuit diagram of the apparatus.

A control circuit is provided (Figure 23) which energizes and deenergizes the player head solenoid 302 and braking solenoid 361, and which controls the playing of recordings placed on either the right or the left hand side, or both. The circuit is shown connected to a source of alternating current supply. The switch 421 controls the power to the amplifiers, power supplies and speakers, while the switch 422 controls the power to the motor and solenoids. The tape end switch 334, player head screw switch 401, and select screw switch 406 were previously described. The record contactors 343, 344 and 346 were also previously described. The switch 423 is a hunt head switch, which was not shown in other figures of the drawings. As shown, the switches 334, 401 and 406 are normally open, while switch 423 is normally closed.

The player head solenoid 302 and the braking solenoid 361 have one side connected to the A.-C. supply line 424 and the other side is connected to the common line 426. The line 426 connects to one side of the switches 334, 401, 406 and to one side of the select switches 133. The other side of the switches 334, 401, 406 and 423 connects to the second A.-C. supply line 427. The second side of one pair of selector switches connects to contactor 343, while the other side connects to contactor 346.

The select switches 133, which are double pole switches, have their second side connected to the pickup head as shown. The magnetic head units are connected to the right and left amplifiers and speakers.

Switch 334 mounted on the player head is activated by lever 326, which rides on the tape. As previously described, this lever is provided with a linkage that does not activate the switch until the supply reel is empty and the tape begins to overrun. At this point, the switch 334 is closed. When switch 334 is closed, solenoids 302 and 361 are energized. This causes the selector screw to rotate through 180-degrees, thereby advancing the select screw mount to engage the select switches 133 with the next selector button. It also causes the head screw to rotate thereby displaying the player head. The lever 326 is retracted when the solenoids are energized, but as the hunt head moves to the next select ring, the switch 423 closes, thereby keeping the solenoids 302 and 361 energized and control in switch 423.

In the circuit described, the selector switches 133 are interconnected with the end of recording contactors 343, 344 and 346. If the right hand pickup head 291 is energized, the contactors 343 and 344 are brought into operation. As the end of recording strip passes over the contactors 343 and 344, the circuit is completed through the select switches 133 and the solenoids 302 and 361 are energized. As previously explained, this causes the selector screw to rotate through 180-degrees, thereby advancing the selector screw mount to engage the selector switches with the next selector button. This also causes the player head screw to rotate, thereby displacing the player head. All other operations are also as previously described and need not be detailed. On the other hand, if the left hand pickup head is energized, the contactors 344 and 346 are interconnected. When the end of recording strip shorts the points 344 and 346 the solenoids will be energized. This interconnection with the select switches 133 permits control to lie in the recording which is being played. Otherwise, if one recording were longer than the other, the end of the first recording would energize the solenoids 302 and 361, and thereby advance the player head to the next magazine. If the shorter recording were not being played, the advance would occur prior to the end of the reproduction.

The player head travels traversely across the magazines to the right. If the magazine desired lies between the player head position and the right hand side, the hunt head lever 157 will engage the cam 156, thereby opening the switch 423. When this occurs, the solenoids 302 and 361 are deenergized. The pin 367 strikes the arm 363 and the player head stops its travel. Simultaneously, the solenoid 302 causes the positioning wedge 307 to engage the rollers 308, thereby exactly positioning the head. The roller 301 engages the magazine 112, and presses it forward, thereby placing the tape in contact with the feed roller 204 and the takeup reel in contact with the takeup roller 203. If the select magazine does not lie to the right of the player head, the head travels to the extreme right where it actuates the player head screw switch 401, thereby closing the switch. This maintains the solenoids 302 and 361 energized until the player head has travelled completely across the head screw and abuts the left hand side. Switch 401 is opened and the hunt head switch 423 regains control. As before, when the hunt head lever engages the cam, the hunt head switch 423 opens, the player head stops, the tape is engaged and the recording reproduced.

When the select switch mounting has reached the extreme right position, it locks the lever 368 so that the select screw continues to rotate, thereby returning the select switch mount to position 1. It also closes the switch 406, thereby keeping the solenoids 302 and 361 energized. This permits the return of the select switch mount to the extreme left position, where it engages the abutment which brings the lever 368 back into play, and which also opens the switch 406. With switch 406 open, control is again in the hunt head switch 423.

The selector switches 133 connected to the pickup heads 291 and 292, which in turn are connected to the amplifying system and speakers, are shown. The switches 133 are paired and connected in parallel. As previously described, this is necessary in order to compact the panel and stagger the select knobs 118. One pair of selector switches connects to the right pickup head 291, while the other pair of switches 133 connects to the left pickup head 292. As previously described, by proper orientation of the knob 118, it is possible to make either of the pickup heads 291, 292 or the combination 291 and 292 alive. Referring to the diagram, this is accomplished by closing either one or the pair of switches 133 connected in parallel, thereby presenting a continuous circuit through the pickup head.

For purposes of illustration, let us assume that among the plurality of magazines which are inserted in the machine, the following magazines have the selection indicated:

Magazine 5:
- L (Left)—Waltz
- R (Right)—March

Magazine 10:
- L (Left)—Rumba
- R (Right)—Conga

Magazine 17:
- L (Left)—Tango
- R (Right)—Jazz

Magazine 21:
- B (Binaural)—Song

Further, assume that in the program selected, the operator wishes to play the following selections in the order indicated:

Selection No. 1—Waltz
Selection No. 2—Jazz
Selection No. 3—Song
Selection No. 4—Conga
Selection No. 5—March
Selection No. 6—Rumba
Selection No. 7—Tango The operator observing the panel, sees that the button 117 appears at 10. The operator therefore knows that the next number to be played will be 11. He then grasps the select handle 109 and moves the indicator 111 until it lies under number 11. He then presses the handle to advance the selector ring, step by step, until the number 5 appears in the magazine number display window 114, or he may depress the handle until the select ring drive rotates the select ring until the number 5 appears in the corresponding window 114. The handle 109 is then released, and the knob 118 corresponding to number 11 is rotated until the indicator 128 points to the left. The next number played will correspond to magazine number 5 left hand recording, the Waltz desired for selection one.

Similarly, the operator will move to number 12 and cause the select ring to rotate until number 17 appears at the corresponding magazine display window 114, and rotates the knob 118 to position the indicator 128 to the right, thereby selecting Jazz. On 13, the number appearing at window 114 will be 20 and the knob will be placed in the up position indicating binaural operation. For select position 14, the select ring will be rotated to cause 10 to appear in the magazine number display window 114, and the knob 118 rotated to the right. Similarly, for positions 15, 16 and 17 the magazine numbers 5, 10 and 7 and positions right, left and left will appear respectively.

As the playing of number 10 is completed, the hunt head advances to position 11 and will rotate within the select ring until the hunt head switch is caused to be opened. The switches 113 will be depressed to cause the left detector to be connected to the corresponding amplifier and speaker. The player head will lie over the appropriate magazine, which in this case is magazine No. 5. As previously pointed out, when the selection is completed, the end of recording switch is energized, the magazine is retracted and the player head will advance to the next selection, in this case to magazine 17 and the right hand side detector will be alive. As each selection is played, the apparatus will automatically advance to the next selection and play that selection.

It will be noted that two consecutive selections may not be chosen from the same magazine since the tape takes a finite time to be rewound on the supply reel. In other words, magazine 5 right and magazine 5 left may not be selected to be played consecutively. Magazine 5 left may be played and then another magazine interposed, for example, magazine 17, and then magazine 5 right may be played.

Ii will be evident that by the use of suitable metering apparatus, my machine may be coin operated.

In view of the fact that the magazines 112 are readily insertable, it is possible to provide an embodiment of the machine which eliminates the use of the select rings and hunt head. In such event the player head is so arranged as to advance from one magazine to the next with consecutive playing. By arranging the magazines in the order that the selections are desired, it is possible to play a preselected program. The limitation in this type of device is that all the magazines must be played before a selection may be repeated.

Subject matter disclosed but not claimed in this application is being claimed in copending application Serial No. 626,071, filed November 28, 1956, entitled "Magnetic Tape Apparatus."

I claim:

1. A magnetic tape apparatus comprising a plurality of magnetic tape magazines, a player head adapted to reproduce recordings on the tapes of the magazines, selective means for shifting the head opposite any one of the magazines, means for advancing the selected magazine to bring the tape of the magazine into cooperative relationship with said head, means for driving a selected tape past the head, and means for rewinding the tape following reproduction of the same.

2. Magnetic tape programming apparatus comprising a plurality of magnetic tape magazines, each magazine comprising tape supply and takeup reels, a player head adapted to reproduce recordings on the tapes of the magazines, selective means for shifting the head opposite any one of the magazines, means for moving the tape of each magazine into cooperative relationship with said head, means for driving the selected tape past the head, and means providing a continuous predetermined frictional rewinding force to the supply reel of each magazine to thereby rewind the tape following the reproduction thereof.

3. Magnetic tape apparatus comprising a pluraltiy of magazines each including supply and takeup reels and a magnetic tape engaged with the same, a player head adapted to reproduce recordings on the tapes, selective means for shifting the head opposite any one of the magazines, means for moving a selected magazine to bring the tape in cooperative relationship with said head, means for driving a selected tape past the head, and roller means continuously engaging the supply reels of all of said magazines and providing a predetermined rewinding torque to the same.

4. Magnetic tape programming apparatus comprising a plurality of magazines each having rotatable supply and takeup reels and a magnetic tape engaged with the same, a player head adapted to reproduce the recordings, selective means for shifting the head opposite any one of the magazines, means for moving the tape of a selected magazine in cooperative relationship with said head, means for driving a selected tape past the head, means for rewinding the tape following reproduction of the same, and driving means serving to wind up the tape on the takeup reel.

5. Apparatus as in claim 4 in which said rewinding means includes a drive roller continuously engaged with the supply reel of all of the magazines and wherein said driving means and takeup means are operative only with respect to the selected magazine.

6. Magnetic tape apparatus comprising a plurality of magnetic tape magazines each having tape with recording thereon, a player head adapted to reproduce the recordings, means conditioned by an operator for preselecting a program of said recordings, means for cyclically shifting the head opposite the magazine having the tape corresponding to said programming, means for advancing the selected magazine to bring the tape into cooperative relationship with the head, means for driving the selected tape past the head, and means for rewinding the tape following reproduction of the same.

7. Magnetic tape apparatus comprising a plurality of magnetic tape magazines each having tape with recording thereon, a player head adapted to reproduce the recordings, means conditioned by an operator for preselecting a program of said recordings, means for cyclically shifting the head opposite consecutive selected magazines, means for advancing the selected magazine to bring the tape into cooperative relationship with the said head, means for driving the selected tape past the head, and means providing a continuous predetermined frictional rewinding force to the tape to thereby rewind the tape following reproduction thereof.

8. Magnetic tape apparatus comprising a pluarlity of magnetic tape magazines each having tape with recording thereon, each magazine also including supply and takeup reels engaged by the tape, a player head adapted to reproduce the recording, means serving to carry a plurality of alined selector rings disposed side by side, each of said rings adapted to be set to an angular position corresponding to a particular magazine by an operator, hunt means engaging said rings consecutively and serving to cyclically shift the head to the selected magazine, means for moving the selected magazine thereby placing its tape in cooperative relationship with said head, means for driving a selected tape past the head, and means for continuously applying rewind torque to the supply reels of all of the magazines.

9. Magnetic tape apparatus comprising a plurality of magnetic tape magazines having tape with recording thereon, a player head adapted to reproduce the recordings, means serving to carry a plurality of selector rings, each of said rings having numbers corresponding to each of said magazines on the periphery thereof, means whereby an operator may rotate each of said rings to a number corresponding to a selected magazine, hunt means engaging said rings consecutively to thereby cyclically shift the head to the selected magazine, means for moving the selected magazine thereby placing its tape in cooperative relationship with said head, means for driving the selected tape past the head, and means for rewinding the tape following reproduction of same.

10. Magnetic tape apparatus comprising means serving to carry a plurality of magnetic tape magazines with tape having two adjacent recordings thereon, a player head adapted to reproduce both of said recordings, selective means for shifting the head into cooperative relationship with any one of the magazines, switching means for selecting one of the recordings on a tape, and means for rewinding the tape following reproduction of the same.

11. A magnetic apparatus comprising means serving to carry a plurality of magnetic tape magazines with tape having adjacent recordings thereon, each magazine including supply and takeup reels, a player head adapted to reproduce said recordings, selective means for shifting the head opposite any one of the magazines, switching means for selecting any of the recordings of a tape, means for moving the magazine thereby placing the tape in cooperative relationship with said head, means for driving a selected tape past the head, and means providing a predetermined rewinding torque for the supply reels.

12. Magnetic tape apparatus comprising a plurality of magnetic tape magazines with tape having adjacent recordings thereon each magazine having supply and takeup reels, a player head adapted to reproduce said recordings, means serving to carry a plurality of selector rings, each of said rings adapted to be set to an angular position corresponding to a given magazine by an operator, hunt means engaging said rings consecutively to thereby cyclically shift the head to the selected magazine, selector knobs adapted to be positioned for selection of a given recording of a tape, means including switching means engaging and actuated by said knobs to thereby reproduce the selected recording, said switching means engaging said select knobs consecutively to thereby cyclically select the proper recording, means for moving the selected magazine thereby placing the tape in cooperative relationship with said head, means for driving a selected tape past the head, and means for rewinding a tape at the end of a playing operation.

13. A magnetic tape apparatus comprising a plurality of magnetic tape magazines each having a tape with adjacent recordings thereon, a player head adapted to reproduce said recordings, selective means for shifting the head opposite any one of the said magazines, means including switches for selecting any of said recordings, means for moving a selected magazine thereby placing the tape in cooperative relationship with said head, means for driving a selected tape past the head, means for detecting the end of the recording, means responsive to said last named means for retracting the magazine at the end of said recording and for rewinding the tape after such retraction.

14. Magnetic tape apparatus comprising a plurality of magnetic tape magazines each having tape with adjacent recordings thereon, a player head adapted to reproduce said recordings, selective means for shifting the head opposite any one of the said magazines, said means comprising means serving to carry a plurality of selector rings, each of said rings adapted to be set to a given magazine by an operator, hunt means engaging said rings consecutively to thereby cyclically shift the head to the selected magazine, selector knobs adjusted to be positioned for selection of a given recording, means including switches engaging said knobs to thereby reproduce the selected recording, said switches engaging said select knobs consecutively to thereby cyclically select the proper recording, means for moving the selected magazine thereby placing the tape in cooperative relationship with said head, means for driving a selected tape past the head to reproduce a recording, means for detecting the end of a recording, means responsive to said last means for retracting a selected magazine, and means also responsive to said detecting means for advancing the hunt head to the next select ring and to thereby place the machine in readiness to play the next recording.

15. Apparatus as in claim 14 in which safety means are provided whereby the magazine is retracted when the end of the tape is reached.

16. In magnetic tape apparatus, a plurality of magazines each having a tape with adjacent recordings thereon and having rotatable supply and takeup reels engaged by the tape, each magazine also having guide means for the length of the tape extending between the reels, means serving to support a series of said magazines in side by side relation and whereby each magazine is movable between a forward playing position and retracted normal position of the same, a first tape driving means disposed adjacent all of the magazines, a second driving means for the takeup reels of all of the magazines, a third driving means for the supply reels of all of the magazines and serving to turn a supply reel for a rewind operation, said last named means having continuous frictional driving engagement with said supply reels of all of the magazines for both forward and normal positions of the same, a player head assembly comprising pickup means adapted to engage the tape of a selected magazine when said magazine is in its forward position, means carried by said assembly for causing forward movement of a selected magazine from the normal non-playing position of the same whereby the tape of said magazine is brought into driving relation with the said first named driving means and the takeup reel is brought into driving relation with said second named driving means, means serving to mount the player head for traversing movement from one magazine to another, means adapted to be conditioned by an operator for preselecting the order of magazines to be played, means adapted to be conditioned by an operator for preselecting the recording of a particular tape to be played, and means for causing retraction of a selected magazine and movement of the player head from one magazine to another, at the end of a playing operation.

17. Apparatus as in claim 16 in which said first named drive means consists of a roller driven at a constant speed and extending adjacent all of the magazines.

18. Apparatus as in claim 16 in which the takeup reel is disposed generally above the supply reel, as the magazines are positioned in the apparatus, and in which the second drive means includes a drive roller extending generally above all of the takeup reels and having its periphery in frictional engagement with the takeup reel of a selected magazine in the said forward position.

19. Apparatus as in claim 16 in which said third named drive means consists of a drive roller extending adjacent the supply reels of all of the magazines and below the same, the peripheries of all of the takeup reels having frictional engagement with said roller for both forward and retracted positions of the magazines.

20. Apparatus as in claim 16 in which means is provided for indicating the end of a playing operation, said means comprising arms engaging the tape adjacent the supply reels, the positioning of said arms serving to indicate the end of the tape.

21. Apparatus as in claim 16 in which indicating means is provided for indicating the end of a playing operation, said indicating means for each magazine comprising a conductive area upon the tape, and electrical contacting elements engaging the tape and short-circuited by engagement with said area.

22. Apparatus as in claim 16 together with means for fixing the position of a magazine, when the magazine is moved to said forward position, said means being actuated in conjunction with forward movement of a selected magazine.

23. Magnetic tape apparatus comprising a plurality of magazines each including a magnetic tape having at least one recording thereon and means to supply and take up the same, a player head adapted to reproduce the recording on the tape, selective means for shifting the head opposite any one of the magazines, means for advancing the selected magazine to bring the tape into cooperative relationship with the head, and means for driving the selective tape past the head.

24. Magnetic tape apparatus comprising a plurality of magazines each including a magnetic tape having at least one recording thereon and means to supply and take up the same, a player head adapted to reproduce the recording on the tape, selective means for shifting the head opposite any one of the magazines, tape driving means, and means for advancing the selected magazine to bring the tape into cooperative relationship with the tape driving means and head.

25. Magnetic tape apparatus comprising a plurality of magazines each including a magnetic tape having at least one recording thereon and means to supply and take up the same, means for holding the magazines in a side-by-side relationship, a player head adapted to reproduce the recording on the tape, means for automatically moving the head consecutively from one magazine to the next, tape driving means, and means for advancing the magazines individually into cooperative relationship with the tape driving means and head.

26. Apparatus as in claim 25 in which the magazines are replaceably held in side-by-side relationship.

27. Magnetic tape apparatus comprising a plurality of magazines each including supply and take up reels and a magnetic tape engaged with the same, means for replaceably holding said magazines in side-by-side relationship, a play head adapted to reproduce recordings on the tapes, selective means for shifting the head opposite any one of the magazines, means for moving a selected magazine to bring the tape into cooperative relationship with said head, means for driving a selected tape past the head, and means continuously engaging the supply reels of all of said magazines and providing a predetermined rewinding torque to the same.

28. Apparatus as in claim 27 wherein said player head is moved consecutively from one magazine to the next.

29. A magnetic tape programming apparatus comprising a plurality of magazines each carrying a magnetic tape, a magnetic transducing head adapted to operate on said tape, selective means for selectively shifting the head opposite any one of the magazines, means for bringing the head and the tape carried by the selected magazine into cooperative relationship, and means engaging the tape as the head is brought into cooperative relationship with the tape and serving to drive the tape past the head.

30. Magnetic tape programming apparatus comprising a plurality of tape magazines each having supply and take-up reels and a magnetic tape engaged with the same, a magnetic transducing head adapted to operate on said tape, selective means for shifting the head opposite any one of the magazines, means for bringing the head and the tape carried by the selected magazine into cooperative relationship, means engaging the tape, and means engaging the take-up reel, said means engaging the tape and take-up reel as the head is brought into cooperative relationship with the tape and serving to drive the tape past the head and to wind the same upon the take-up reel.

31. Apparatus as in claim 30, together with means engaging the periphery of the supply reel and serving to rewind the tape following reproduction of the same.

References Cited in the file of this patent

UNITED STATES PATENTS

| | | |
|---|---|---|
| 2,214,468 | Lannerd | Sept. 10, 1940 |
| 2,481,398 | Danisch | Nov. 15, 1949 |
| 2,488,482 | Swarthant | Nov. 15, 1949 |
| 2,507,385 | Shrader | May 9, 1950 |
| 2,650,830 | Potter | Sept. 1, 1953 |
| 2,676,212 | Williams | Apr. 20, 1954 |